REVERTING CALL SYSTEM

Filed Feb. 13, 1952

INVENTORS
GEORGE ELLIOTT
WILLIAM W. PHARIS

BY T. L. Bowes

ATTORNEY

May 3, 1955 G. ELLIOTT ET AL 2,707,725

REVERTING CALL SYSTEM

Filed Feb. 13, 1952 6 Sheets-Sheet 2

INVENTORS
GEORGE ELLIOTT
WILLIAM W. PHARIS

BY T. L. Bowes
ATTORNEY

INVENTORS
GEORGE ELLIOTT
WILLIAM W. PHARIS
BY T. L. Bowes
ATTORNEY

May 3, 1955 G. ELLIOTT ET AL 2,707,725

REVERTING CALL SYSTEM

Filed Feb. 13, 1952 6 Sheets-Sheet 4

INVENTORS
GEORGE ELLIOTT
WILLIAM W. PHARIS
BY
T. L. Bowes
ATTORNEY

REVERTING CALL SYSTEM

Filed Feb. 13, 1952 6 Sheets-Sheet 5

INVENTORS
GEORGE ELLIOTT
WILLIAM W. PHARIS
BY
T. L. Bowes
ATTORNEY

May 3, 1955 G. ELLIOTT ET AL 2,707,725

REVERTING CALL SYSTEM

Filed Feb. 13, 1952 6 Sheets-Sheet 6

INVENTORS
GEORGE ELLIOTT
WILLIAM W. PHARIS
BY T. L. Bowes
ATTORNEY 2,707,725
Patented May 3, 1955

United States Patent Office 2,707,725

REVERTING CALL SYSTEM

George Elliott and William W. Pharis, Rochester, N. Y., assignors to Stromberg-Carlson Company, a corporation of New York Application February 13, 1952, Serial No. 271,408

9 Claims. (Cl. 179—17)

This invention relates to automatic telephone systems and more particularly to reverting call systems for use in automatic telephone systems.

Two methods of handling reverting calls have been extensively used in telephone systems of the automatic type. In accordance with one of these methods, commonly known as the directory number method, the calling subscriber, after dialling the directory number of the called subscriber or substation, restores the receiver to its supporting hook or cradle and, after waiting a reasonable time, again removes the receiver to complete or prepare the desired connection, depending upon whether or not the call has been answered at the called substation. The other method commonly used in handling reverting calls in automatic telephone systems comprises the provision of special reverting call switches or circuits for selective ringing purposes. In practicing this method, the substations associated with the various party lines are provided with special directory number listings. These special directory numbers must be dialled by the calling subscriber in order to set up the reverting call connection.

It is an object of this invention to provide a new and improved reverting call system.

It is another object of this invention to provide a new and improved reverting call system having particular utility with connectors of the terminal per station type.

It is still another object of this invention to provide a reverting call system of the directory number type in which the directory number is prefixed by a special digit or digits.

A further object of our invention is to provide new and improved ringing control means in connection with reverting calls.

In carrying out the principles of the present invention, there is transmitted a prefix digit or digits, as by means of a dialling mechanism, followed by the directory number of the called subscriber. Following the dialling of the above described digits, the calling party hangs up. The reverting call circuit provided in accordance with our invention repeats all of the dialled digits of the directory number to the succeeding switch train. After the last digit is repeated by the reverting call circuit, a busy tone is returned to the calling subscriber who then hangs up or replaces his receiver. The succeeding switch train includes a connector which is conventional for the most part. However, the connector is arranged so that upon the receipt of the last digit and disconnect by the calling party, means is provided to effect the release of the busy test relay and the seizure of the line by the connector. After a brief time interval, ringing is established.

Figure 2:
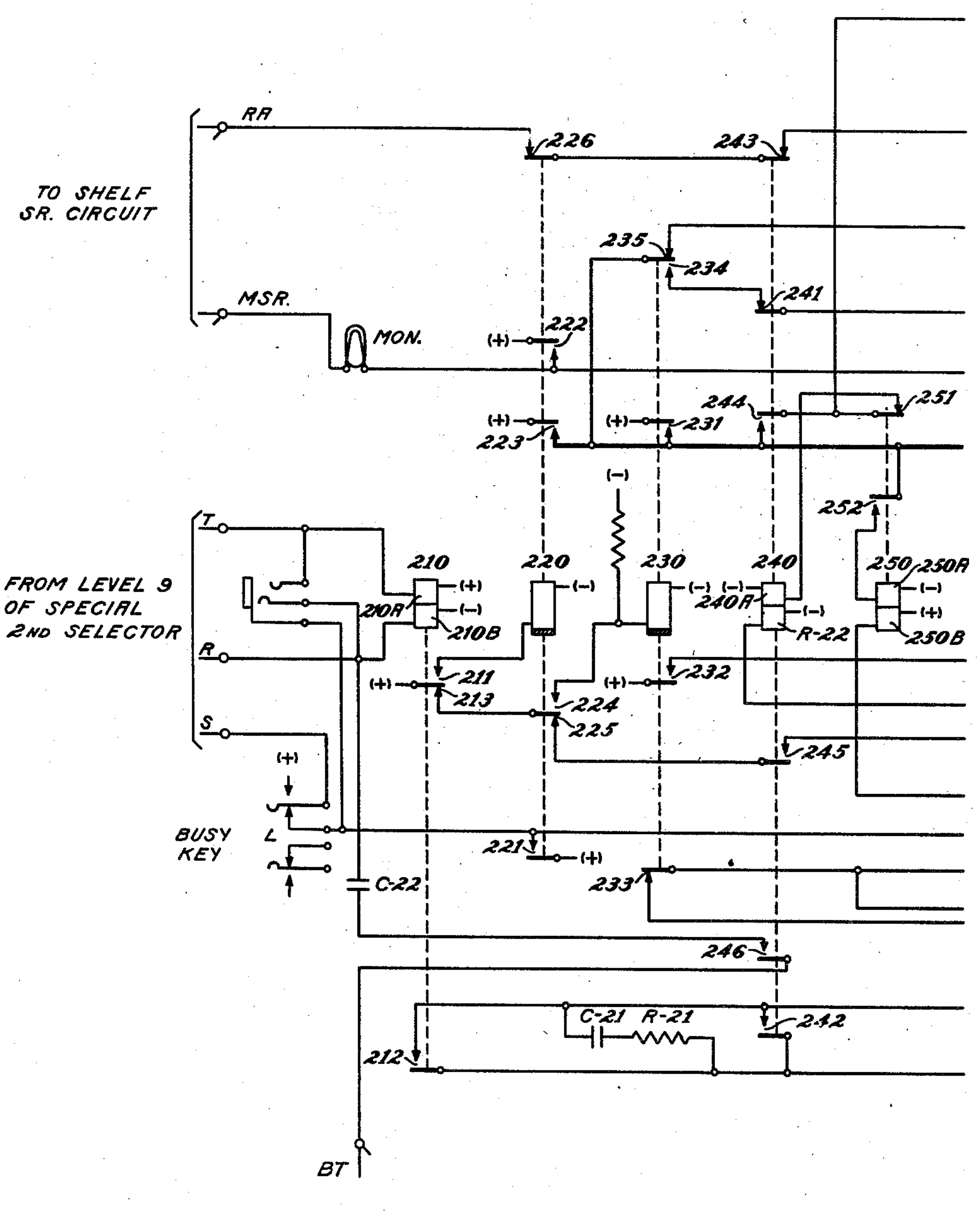
Figures 3, 4:
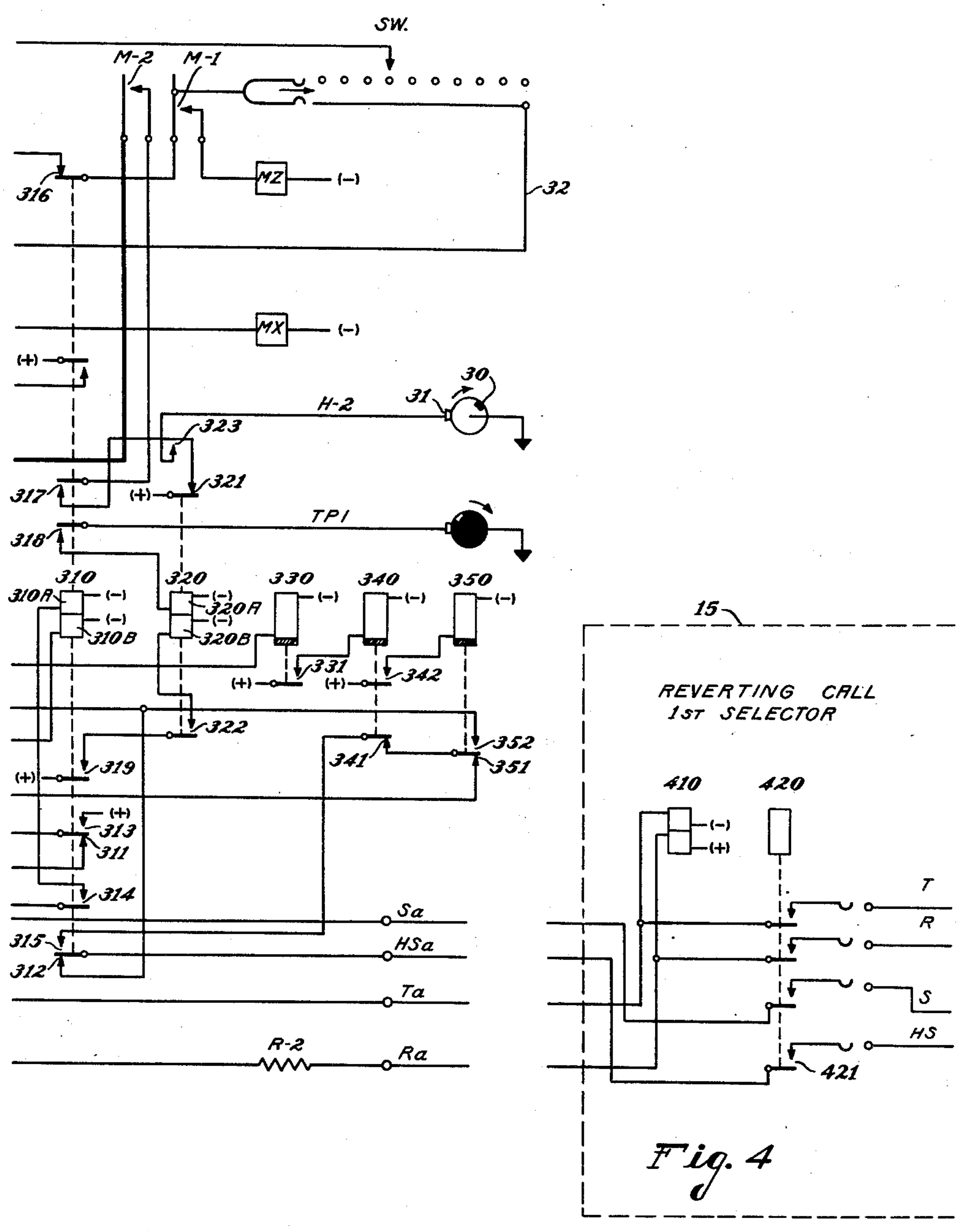
Figure 6:
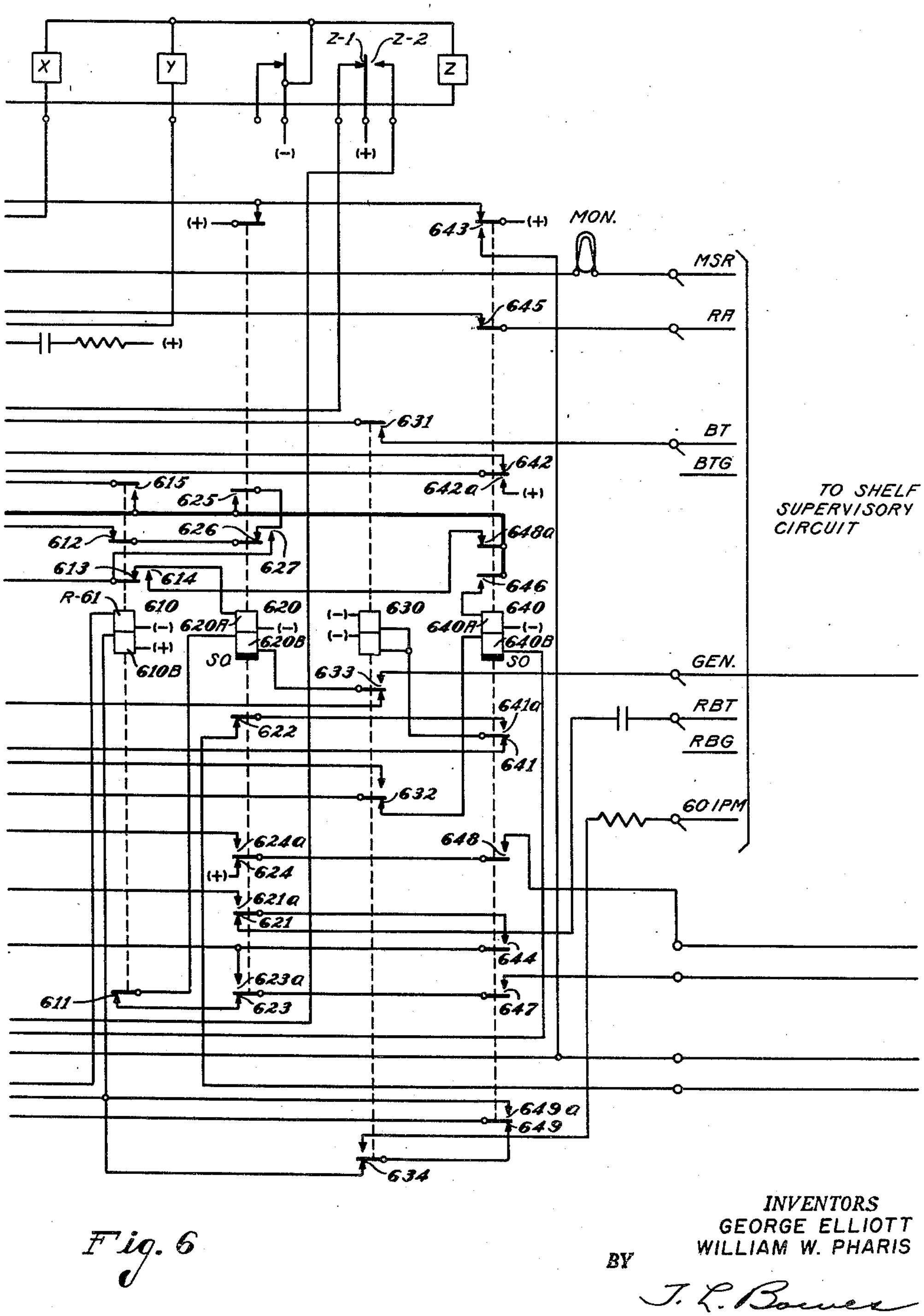
Figure 7:
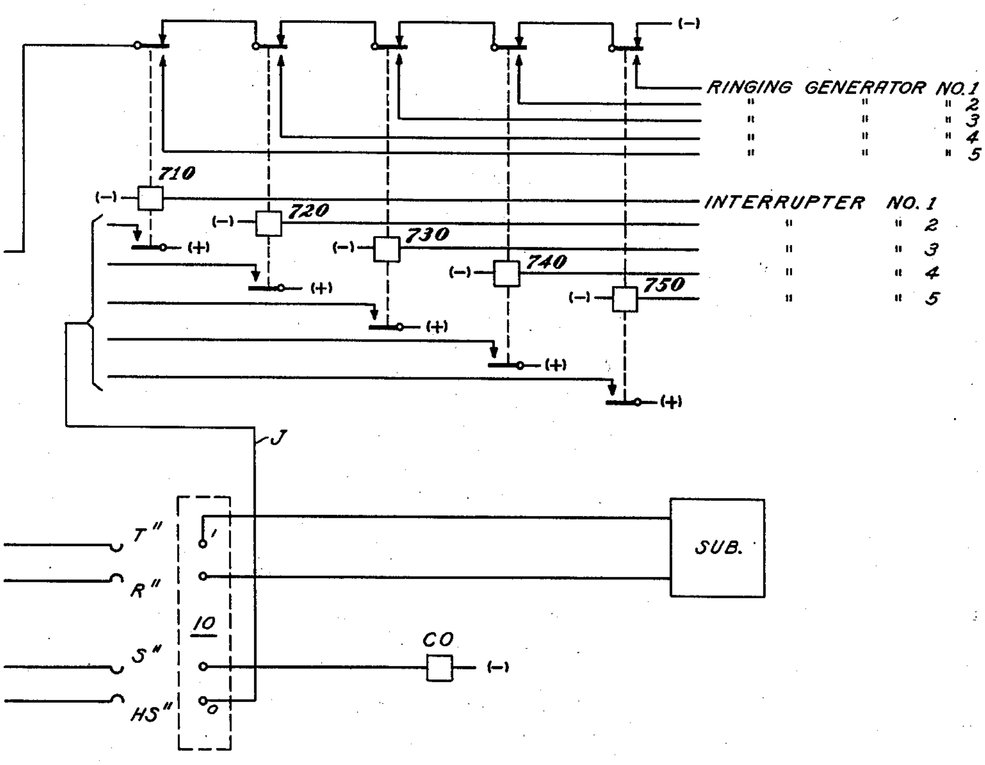

The features of the invention which are believed to be novel are set forth with particularity in the appended claims. The invention itself, both as to its organization and manner of operation, together with further objects and advantages thereof, may best be understood by reference to the following description taken in connection with the accompanying drawings in which Fig. 1 is a skeletonized representation of an automatic telephone system embodying the principles of the invention, Figs. 2 and 3 represent the circuit connections of the reverting call circuit identified in Fig. 1, Fig. 4 illustrates partial circuit connections of a suitable reverting call first selector as identified in Fig. 1, Figs. 5 and 6 disclose circuit connections for the connectors outlined in Fig. 1, and Fig. 7 represents suitable line circuits and interrupted ringing supply for the system shown in Fig. 1.

GENERAL DESCRIPTION

Figure 1:
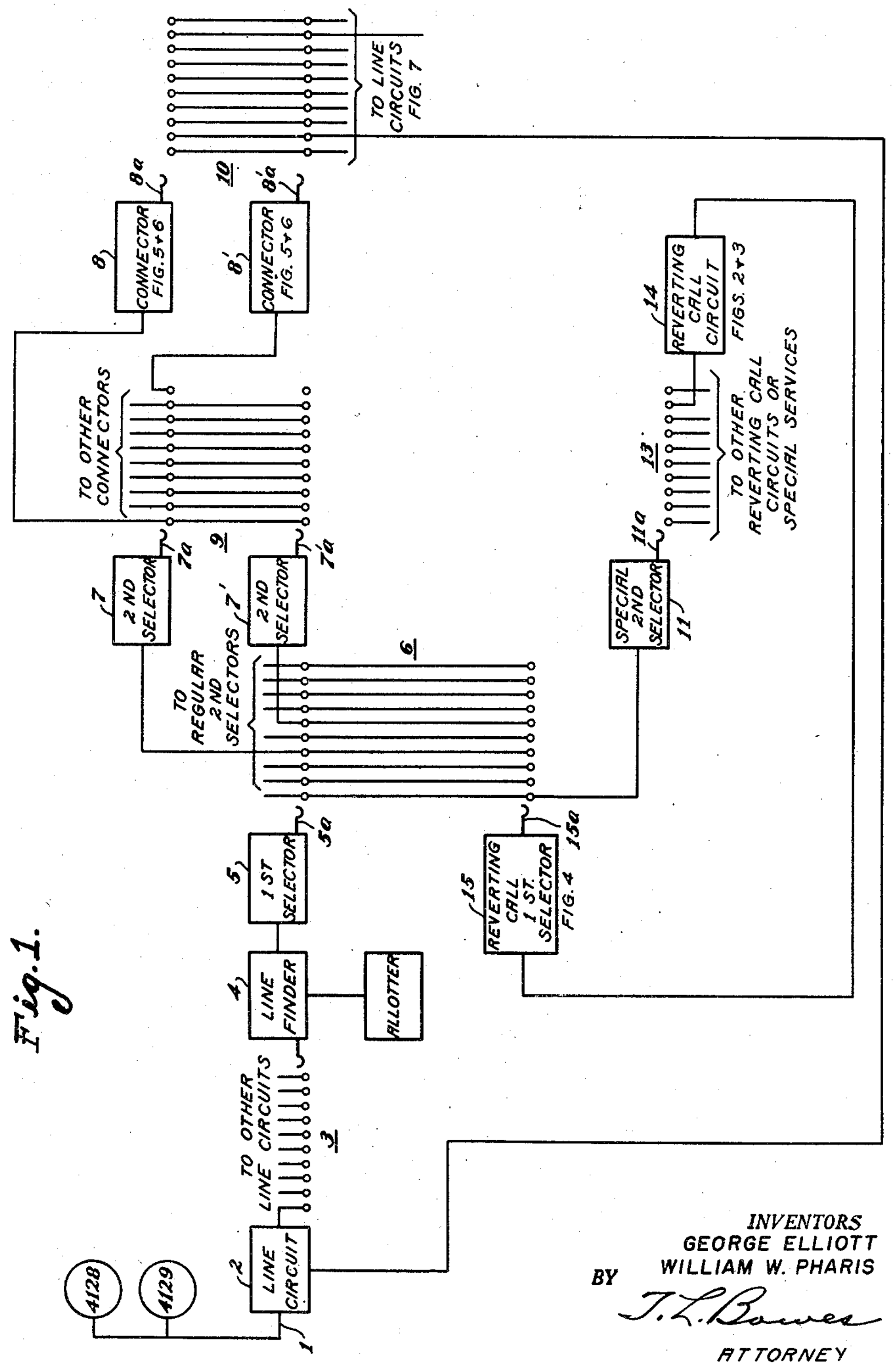

Referring to the system layout indicated in Fig. 1, there is illustrated a party line 1 terminating in a suitable line circuit 2, the line circuit being connected to terminals in the bank 3 of line finders 4, one of which is illustrated. Each finder is permanently associated with a first selector 5 as indicated. Each selector is provided with a suitable step-by-step switch comprising a plurality of brushes, one of which is indicated by the numeral 5*a*, which may be advanced to engage contacts or terminals in selector bank 6. In the arrangement shown in Fig. 1, all levels of the first selectors except the first level are extended to suitable second selectors, such as indicated by numerals 7 and 7′, in order to extend calls between different lines or trunks through connectors such as indicated by numerals 8 and 8′. Each of the second selectors is provided with a suitable step-by-step switch having brushes, one of which is indicated by the numeral 7*a* for engagement with terminals or contacts within selector bank 9. Selectors 7 and 7′ are thus operated to extend calls to connectors 8 and 8′ which, through the agency of suitable step-by-step switches and connector bank 10, in turn, extend the call to line circuits in conventional fashion. By way of example, connector 8 is connected to contacts in the first level of the selector bank 9 and connector 8′ is connected into the tenth level of bank 9.

In order to provide reverting call service and other special services in the system illustrated in Fig. 1, there are provided special second selectors, one of which is indicated by the numeral 11 connected into the first level of selector bank 6. Selectors 11 are special only in the sense that they are assigned solely to special services such as reverting calls, calls to information, wire chief, and so forth, as distinguished from call forwarding services. The special second selectors may employ conventional circuits and may be identical to the other second selectors 7 and 7′. Each special second selector 11 is connected into the first level of bank 6 and is provided with a suitable step-by-step switch, one wiper or brush of which is represented by the numeral 11*a* and arranged for engagement with suitably disposed contacts in bank 13. In the arrangement shown in Fig. 1, the reverting call circuit 14 is connected into the ninth level of bank 13 and the detailed circuit is shown in Figs. 2 and 3.

Each reverting call circuit 14 is permanently connected to a reverting call first selector 15 which includes a suitable step-by-step switch having wipers or brushes, one of which is indicated by the numeral 15*a*. The reverting call first selectors 15 are disposed for cooperation with selector bank 6 in order to extend reverting calls through second selectors 7 and 7′ and connectors 8 and 8′.

In setting up a reverting call connection, the calling line 1 is extended through the line circuit 2 and line finder 4 to a first selector 5 upon the initiation of the call by lifting the receiver at one of the substations connected to line 1. The calling subscriber then dials the prefix number, assumed in the present application to be "19." Responsive to the dialling of the digit "1," the regular first selector 5 selects an idle special second selector 11 in the first level of selector bank 6. In turn, in response to the dialling of the digit "9," the seized special selector 11 selects an idle reverting call circuit 14 in the ninth level of bank 13.

Let it be assumed that the directory numbers comprise four digits. When the first or thousands digit is next dialled by the calling subscriber, certain circuit operations are effective in reverting call circuit 14 to repeat the digit to the reverting call first selector 15. Let it be assumed that the called subscriber is represented by the number 4129. Responsive to the receipt of the four impulses in the thousands digit, the reverting call first selector 15 is advanced to the fourth selector level and then hunts within that level for an idle second selector such as selector 7, for example.

When the second or hundreds digit 1 is dialled the wipers of selector switch 7 advance into the first level of bank 9 and then hunt through that level for an idle connector such as connector 8.

When the third or tens digit 2 is dialled, connector 8 is caused to advance to the second level of bank 10 and in response to the fourth or units digit 9, the wipers of connector switch 8 advance to the ninth position within the second level.

Busy tone is then returned from the reverting call circuit 14 to the calling party who thereupon replaces his receiver on the switch hook or cradle at his substation. As will be more fully described hereinafter, the busy test relay, which operated upon the testing busy of the called line inasmuch as the calling and called line are the same, is released. Upon the release of the busy test relay, the connector switches through and seizes the called line. A battery pulse is forwarded from the reverting call switch which causes the connector to apply a suitable ringing signal to the seized line. Thereafter, removal of the receiver at either the called or the calling station sets up circuits to provide a talking connection through the connector 8. Responsive to the answering of the call, the reverting call first selector 15 and reverting call circuit 14 are released, the line finder 4 and first selector 5 having previously been released.

In the present embodiment of the invention, connectors 8 are preferably of the type in which release is controlled by the last station to hang up, i. e., the connector is not released as long as there is a closed circuit across the line conductors to which the connector is connected. Consequently the connector remains in connection with the line circuit for supplying talking battery to the connector until both calling and called subscribers hang up or replace their receivers, at which time all of the circuits restore to normal.

Means is also provided for releasing the switch train if the calling party fails to complete dialling of the directory number or if the call is not answered within a predetermined interval of time.

*Call between subscribers on different lines*

Figure 5:
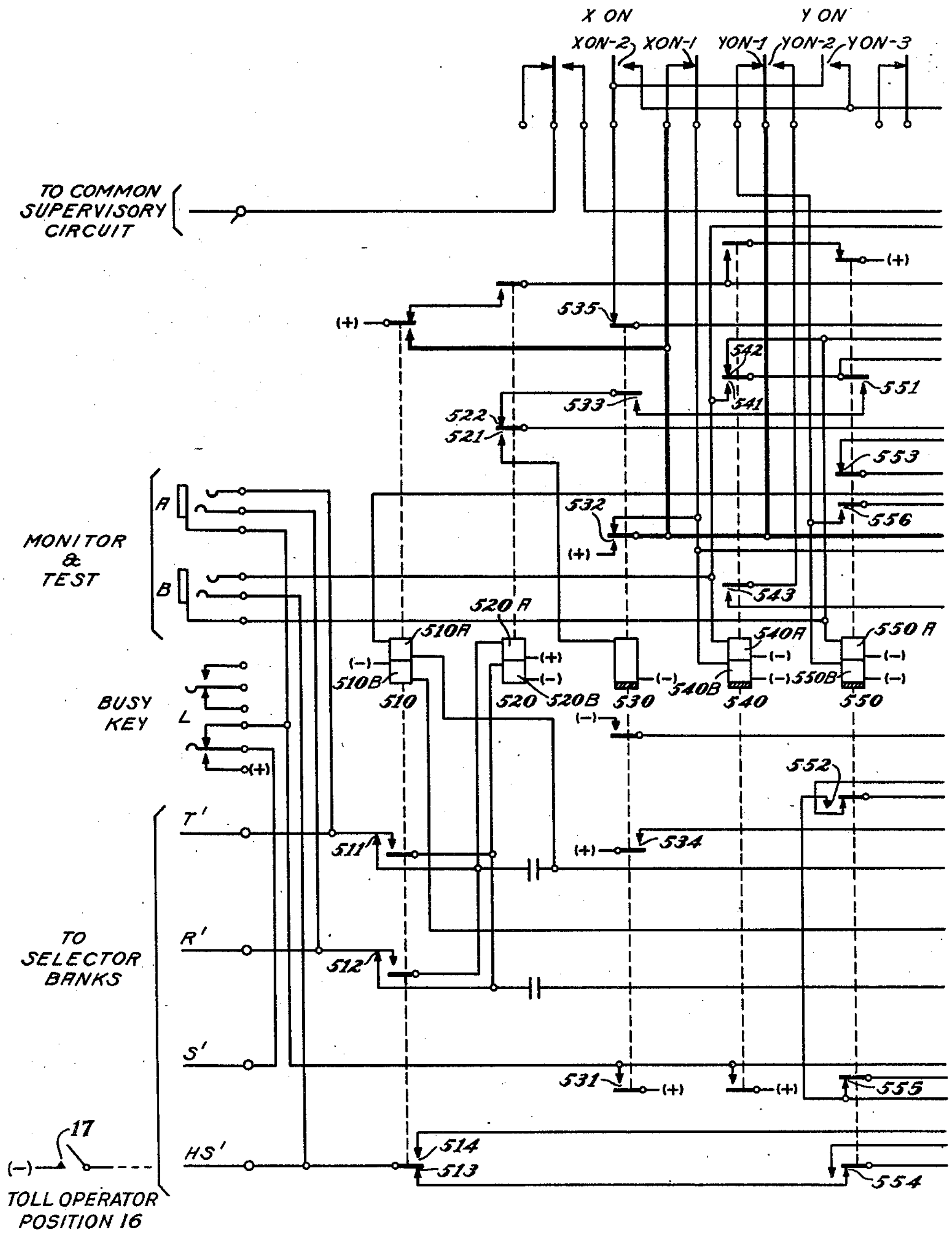

Before describing the detailed operation of the circuits involved in reverting calls, it is believed desirable to describe a non-reverting call, i. e., a call between subscribers on different lines, in order to make clear the normal operation of the system, and in particular connectors 8 and 8′. Let it be assumed that a finder-selector link including finder 4 and selector 5 has responded to a calling condition on line 1 to complete an extension of the call through second selector 7 to connector 8′. Referring to Figs. 5 and 6 upon the seizure of connector 8′ there is completed a loop to operate calling bridge relay 520 over a circuit extending from ground, represented herein by (+), through relay winding 520A, normal contacts 511, calling loop including tip and ring conductors T′ and R′, respectively, normal contacts 512 and relay winding 520B to battery, indicated by (−). Responsive to the operation of relay 520, there is completed a circuit for energizing slow-to-release delay relay 530 over a circuit extending from battery through the winding of relay 530, operated contacts 521, and release magnet contacts Z–1 to ground.

Relay 530 operates and grounds the sleeve lead S′ at operated contacts 531, and closes a circuit to operate X delay relay 540 and Y delay relay 550 in parallel. Relay 540 is operated from ground on operated contacts 532 through the X off normal contacts XON–1 and winding 540B to battery. Relay 550 is energized from ground through operated contacts 532, Y off normal contacts YON–1 and relay winding 550B to battery.

As is well known in the art, the calling bridge relay 520 follows the station selecting digits (in this case digits 03). During the dialling of the first of these digits, upon restoring at each impulse, the circuit for energizing relay 530 is opened at contacts 521. However, relay 530 is provided with a slow-to-release characteristic such that relay 530 remains operated during impulsing. Upon each restoration of relay 520, there is completed a circuit for operating the primary stepping magnet X of the step-by-step switch associated with connector 8′ over a circuit extending from battery through the stepping magnet X, operated contacts 541, operated contacts 551, operated contacts 533, normal contacts 522, and release magnet contacts Z–1 to ground, thus stepping the switch in the primary direction. Any suitable step-by-step switch may be used but there is herein illustrated an arrangement employing the so-called "XY" switch in which the primary and secondary movements are designated as X and Y, respectively. When the connector switch moves off normal, the X off normal springs operate to open the circuit to winding 540B at contacts or springs XON–1. Relay 540, having a slow release characteristic does not release, however, during the impulsing.

Relay 520, upon reoperating after the last impulse of the tens digit, again opens the circuit for energizing the stepping magnet X and recloses the circuit for energizing relay 530 at operated contacts 521. Upon the restoration of relay 540 following the termination of the tens digit, the impulsing path is transferred to the Y magnet at normal contacts 542.

During the dialling of the second station selecting digit, i. e., the units digit 3, relay 520 again follows the dial pulses and upon restoring each time again opens the circuit for energizing relay 530 and closes the impulsing circuit for the secondary motion magnet Y at normal contacts 522. Winding 550A is energized in parallel with the Y magnet impulsing circuit. The Y magnet is operated to cause the connector switch to step in the secondary or Y direction. When the switch moves off normal in the Y direction the off normal springs YON operate and open the circuit to relay winding 550B at contacts YON–1. Relays 550 and 530 remain operated during impulsing due to their slow release characteristics. Upon the reoperation of relay 520 after the last impulse of the units digit, the circuit for energizing relay 530 is again completed at operated contacts 521.

At this point the busy test is made by connecting the busy test relay 630 to the sleeve wiper S″ (Fig. 7) in conventional fashion. The presence of ground on the sleeve wiper S″ is indicative of a busy connection and operates busy test relay 630 from ground on the sleeve through still operated contacts 552, normal contacts 641 and both windings of relay 630 in parallel to battery. If the line tests busy, busy tone on busy tone lead BT is returned to the calling line by way of operated contacts 631, normal contacts 553, normal contacts 642, winding 510A of relay 510, normal contacts 511 and capacitor to tip lead T′ so that busy tone is applied as soon as relay 550 restores. Absence of ground on the sleeve bank terminal, signifying an idle line, prevents the operation busy test relay 630 so that when relay 550 restores there is completed a circuit for operating the switch-through relay 640 over a circuit extending from cut-off relay battery in the line circuit (Fig. 7) by way of the sleeve bank and sleeve wiper S″, normal contacts 555, lower winding 640B, normal contacts 632 and operated contacts 534 to ground. Responsive to the operation of switch-through relay 640, the sleeve lead S″ is grounded at operated contacts 642; ring back tone is applied to the ring lead R′ through operated contacts 644 and normal contacts 621; relay 630 is connected to the HS″ lead through operated contacts 641*a* and normal contacts 622; a holding circuit is completed from battery through winding 640*a*, operated contacts 646 and 532 to ground; and a circuit is prepared for operating the answering bridge relay 510 at operated contacts 642A and 648.

Ringing of the called station is effected over the following circuit. With relay 640 operated, ground is applied from one of the common ringing interrupter relays 710 to 750 by means of a suitable jumper connection J, ring control terminal and wiper HS″ of the connector switch, normal contacts 622, operated contacts 641*a* and windings of busy test relay 630 to battery. Relay 630 is thereupon reoperated as a ringing relay during any one of the five ringing intervals determined by the jumper connection J. Therefore, the generator marking (HS) terminal of the individual line selected by the connector can be cross-connected to effect the operation of relay 630 at any one of five ringing intervals for selecting any one of the five ringing generator sources by extending the circuit from the generator source through contacts of ringing interrupter relays 710 to 750 and common generator conductor GEN, operated contacts 633, winding 620B of ring trip relay 620, normal contacts 611, normal contacts 623, operated contacts 647, ring wiper R″ and corresponding contact in connector bank 10, called line and substation in series, tip terminal and wiper T″, operated contacts 648 and normal contacts 624 to ground. By means of the foregoing arrangement, terminal-per-station operation is provided so that a station may be moved from one line to another without changing the station number if there is a vacancy on the line to which the station is moved having the same ringing frequency or ringing code as the station to be moved. (If the vacancy is for a different frequency, it is necessary to change the station ringer to that frequency.) This results from the fact that the tip, ring and sleeve terminals of the connector bank associated with any station number can be cross-connected to any line and the marking (HS) terminal can be cross-connected to any frequency or code.

When the called party answers, a metallic path is closed for the direct current operation of ring trip relay 620 due to superimposed or tripping battery, not shown, on the common generator lead GEN. The ring trip relay 620 is provided with a preliminary make contact 625 which recloses a circuit for operating relay 540 over a circuit from ground through operated contacts 532 and 625, normal contacts 626 and 612 to the winding 540B. The following reoperation of relay 540 closes a circuit to winding 620A over a circuit extending from ground at operated contacts 532 by way of off normal springs YON–2, operated contacts 543, normal contacts 613, and winding 620A to battery. Ring trip relay 620 now fully operates and opens the circuit through relay winding 540B at normal contacts 626; closes a holding circuit for winding 620A through operated contacts 627, 625, and 532 to ground; disconnects the busy test relay 630 from wiper HS″ at contact 622; disconnects ring back tone at contacts 621; switches the tip lead T″ through to relay 510 at operated contacts 624*a*; and switches the ring lead R″ through to winding 510B of relay 510 through operated contacts 647, 623A, 644 and 621A. Relay 540 restores and relay 510 operates on ground furnished at operated contacts 642A and the previously described circuit.

When the calling party disconnects first, the loop to calling bridge relay 520 is opened whereupon relay 520 restores and de-energizes relay 530. The restoration of relay 530 removes ground from the sleeve at contacts 531 in order to allow the preceding equipment to restore, and recloses the circuit for energizing relay 540, relay 540 reoperates and grounds the sleeve lead to hold this circuit busy. When the called party disconnects, the loop to answering bridge relay 510 is opened and upon its restoration ground is removed from the sleeve lead and the remaining operated relays restore. Upon the restoration of switch-through relay 640, a circuit is completed for energizing release magnet Z from ground on lead RA through normal contacts 645, normal contacts 535, off normal contacts XON–2 and YON–3 in parallel and release magnet Z to battery. The release magnet operates, allowing the switch to return to normal, and operates its associated contact Z–2 which places ground on the sleeve lead to guard the connector circuit during release. When the switch returns to normal the off-normal springs open the circuit to the release magnet Z which thereupon restores. The return of the off-normal springs Z–2 to normal removes ground from the sleeve lead.

If the called party disconnects first, the loop to answering bridge relay 510 is opened. When the calling party disconnects, the loop to calling bridge relay 520 is opened and that relay thereupon restores and opens the circuit to relay 530. When relay 530 restores, ground is removed from the sleeve lead to allow the release of the preceding equipment and opens the circuit to relays 620 and 640 whereupon these relays restore and the circuit continues to release as described in connection with calling party disconnect in the preceding paragraph.

*Toll access*

Inasmuch as toll relay 610 is utilized when the connector is seized during the extension of a reverting call, as well as during the extension of toll calls, toll access is next described.

On a call from toll operator position 16, Fig. 5, the connector circuit disclosed in Figs. 5 and 6 functions in the same manner as on a local call with the following exceptions. During the dialling of each digit, the associated trunk circuit forwards battery in any suitable manner, as by a suitable dial or key represented by numeral 17, under the control of a toll operator, for example, on the HS′ lead to operate relay 610 over a circuit extending from battery on lead HS′ through normal contacts 513, 554, 649, 634 and the lower winding of relay 610 to ground. In response to the resulting operation of relay 610, ring trip relay 620 operates from master ground at contacts 532 through normal contacts 648*a*, operated contacts 614 and winding 620A to battery, thereby preventing the application of ringing.

Assuming the use of a dial by the toll operator, relay 610 operates during the dialling of each digit to close the circuit to ring trip relay 620 by way of operated contacts 614, and normal contacts 648*a*, and relay 620 remains operated from master ground by way of operated contacts 625 and 627 and transfer contacts 613 and 614. Relay 610 also provides holding ground for relay 550 by connection through contacts 556, 615 and 532.

When the operator has completed dialling, relay 610 is released and the called line, if idle, is seized without ringing by the operation of relay 640 as previously described. Should a party on the line attempt to place a call while the toll operator is holding the line, answering bridge relay 510 operates to give supervision to the toll operator.

When the toll operator wishes to ring, battery is forwarded on the HS′ lead to re-operate relay 610. The re-operation of relay 610 opens the above traced holding circuit for relay 620 at now open contacts 613 (the alternate holding circuit through contacts 614 and 648*a* being open at contacts 648*a*) and, at contacts 611, opens part of the circuit from the common generator lead GEN to the ring side of the line in order to prevent application of the ringing current until relay 610 restores because, with relay 610 operated, there exists no possibility of tripping ringing. When relay 620 restores, a ringing circuit is prepared at normal contacts 623. Toll relay 610 restores when battery is removed from the HS' lead and the ringing circuit is now completed from lead GEN through operated contacts 633, winding 620B, normal contacts 611 and 623 and operated contacts 647 to the ring lead R''.

*Reverting call*

In connection with the following description it is assumed that the prefix required to reach a reverting call circuit is "19" and that the directory number of the called subscriber is 4129.

In response to the dialling of the digit "1," the first selector enters the first level of bank 6 and hunts for an idle special selector 11. In response to the receipt of the digit "9" selector 11 advances to the ninth level of bank 13 and selects an available reverting call circuit 14.

Upon seizure of reverting call circuit 14, see Figs. 2 and 3, a loop is completed for operating calling bridge relay 210 by way of the extended calling loop including conductors T and R of Fig. 2 and windings 210A and 210B of relay 210.

The resulting operation of relay 210 effects the energization of slow-to-release relay 220 in an obvious circuit including operated contacts 211, and bridges the outgoing tip and ring leads T*a* and R*a*, respectively, to the reverting call first selector 15 through operated contacts 212, thereby providing circuit means for seizing the reverting call first selector 15 and repeating dial pulses to the reverting call selector.

The operation of relay 220 grounds the back sleeve lead S at operated contacts 221 in order to hold the preceding equipment; grounds the front lead S*a* through operated contacts 221, normal contacts 311 and normal contacts 233; grounds the monitor supervisory lead MSR through operated contacts 222 and monitor lamp MON; establishes master ground at operated contacts 223; and prepares a circuit for operating relay 230 at operated contacts 224.

The calling subscriber proceeds to dial the directory number of the called subscriber. On the previously stated assumption that the directory number is 4129, in response to the receipt of the digit "4," relay 210 follows the impulses whereby contacts 212 and 213 pulse. On the first release of relay 210, relay 230 operates from ground through normal contacts 213, operated contacts 224 and the winding of relay 230 to battery. It is noted that both relays 220 and 230 are provided with slow-to-release characteristics so that these relays hold up between the pulses of each digit.

The operation of relay 230 completes a second connection for master ground through contacts 231; disconnects the front sleeve lead S*a* from the back sleeve lead S at contacts 233; and completes a circuit for energizing the stepping magnet MX of the minor switch SW from ground through the magnet MX, normal contacts 241 and operated contacts 234 to master ground. The minor switch SW advances one step. Off normal springs M–1 and M–2 operate as soon as the switch SW moves away from its normal or home position. The closure of contacts M–1 prepares a circuit for operating release magnet MZ through normal contacts 316, 243 and 226 to ground on lead RA. The release circuit is not energized at present because of the energization of relay 220 and the consequent open condition of contacts 226. Switch contacts M–2 extend master ground to contacts 317 of relay 310.

Since relay 230 remains energized during pulsing because of its slow-to-release nature, the minor switch advances only one step for each digit received in the reverting call circuit; hence the continued pulsing of contacts 213 in response to the dialling of the thousands digit "4" has no further effect but the pulsing of repeating contacts 212 causes selector 15 to advance to a level corresponding to the dialled digit, i. e. the fourth level and then to hunt in the fourth level for an idle second selector. The tip and ring conductors T*a* and R*a* are bridged by the series connection of capacitor C21 and resistor R–21 in order to minimize sparking at the impulsing contacts 212.

At the end of the first digit of the directory number, relay 210 is re-operated over the calling loop which effects the re-operation of relay 220 and permits the restoration of relay 230.

Upon the receipt of the second digit "1" of the directory number, relay 210 again releases to re-energize relay 230 and the foregoing sequence of operations again follows to advance minor switch SW to its second position and to forward a single pulse to advance the second selector 7 to the first level and initiate its hunting through that level for an idle connector 8.

Upon receipt of the third digit, in a manner similar to that heretofore described, the minor switch SW advances to its third step and the pulses repeated by contacts 212 result in the stepping of the connector switch 8 to the second level. Upon the receipt of the last digit, the minor switch advances to its fourth position and the connector advances its brushes to engage the contacts or terminals representing the ninth position in the second level. The stepping of minor switch SW to its fourth position prepares a circuit for operating relay 240 through winding 240A, normal contacts 251, fourth contact of switch SW, brush of switch SW, conductor 32 and normal contacts 235 to master ground. As soon as relay 230 releases following the reoperation of relay 210, relay 240 operates.

The operation of relay 240 shunts the tip and ring leads T*a* and R*a*, respectively, at operated contacts 242 in order to hold the succeeding equipment after the release of relays 210 and 220 when the calling subscriber hangs up; opens the release circuit for release magnet MZ at contacts 243 in order to prevent the premature release of minor switch SW; opens the stepping circuit for magnet MX at contacts 241 to prevent the further advance of the minor switch; completes a locking circuit for itself from master ground through operated contacts 244, normal contacts 251, and winding 240A; prepares a circuit for the energization of winding 310B of relay 310 at operated contact 245; and applies busy tone to the calling loop from busy tone lead BT through operated contacts 246, capacitor C–22 and ring lead R.

Referring to the connector as illustrated in Figs. 5 and 6, it is assumed that the connector wipers or brushes shown in Fig. 7, stand on the contacts representing the called line. Assuming that the calling subscriber has not yet hung up his receiver in response to the receipt of the busy tone, toll access relay 610 (now to be employed as a ring control relay) stands operated from resistance battery (the lower winding of relay 240 acting as a resistor, indicated by the designation R–22) by way of normal contacts 312, the HS*a* lead, operated contacts 421 and brush of selector 15, lead HS, second selector 7, lead HS' of connector 8, normal contacts 513, 554, 649 and 634 to winding 610B and ground. While resistor R–22 is shown as one winding of relay 240, it will be understood that a separate resistor may be employed if desired. Relay 550 is locked operated from master ground provided through operated contacts 532, operated contacts 615 and operated contacts 556 through winding 550B to battery; ring trip relay 620 is operated from master ground through normal contacts 648A, operated contacts 614 and winding 620A to battery; and the application of ringing current to the called subscriber's line is prevented by the operation of normal contacts 611.

Now, when the connector switch engages the terminals corresponding to the called subscriber, ground is applied to operate busy test relay 630, the circuit extending from battery through the windings of relay 630 in parallel, normal contacts 641, operated contacts 552, sleeve brush S″ and through the multipled connector-finder banks, line finder 4 and selectors 5 and 11 to ground at contacts 221 of the reverting call circuit.

Referring back to the operation of the reverting call circuit, attention is called to the fact that busy tone has been extended to the calling subscriber. As soon as the calling subscriber hangs up or replaces his receiver thereafter, relay 210 releases because of the opening of the extended calling loop. After a short delay, relay 220 releases. However, during the period between the release of relay 210 and the release of relay 220, relay 230 is reoperated over a circuit extending from ground through normal contacts 213, operated contacts 224 and winding of relay 230 to battery. In response to the re-operation of relay 230, slow-to-release relays 330, 340 and 350 operate successively by way of obvious circuits. At this point it may be noted that these relays also operated during the stepping of minor switch SW but the operation of these relays at that time was without effect. Now when relay 220 releases, ground is removed from the back sleeve lead S at contacts 221 so that the finder 4 and selectors 5 and 11 are released; and relay 310 operates over a circuit extending from ground through normal contacts 213 and 225 and operated contacts 245 through relay winding 310B to battery; and relay 230 is de-energized by the opening of contacts 224. Also, when ground is removed from the sleeve lead S, because of the opening of contacts 221, ground is also removed at sleeve brush S″ of the connector thereby releasing busy test relay 630 in the connector.

Referring again to the connector, the release of busy test relay 630 prepares at contacts 632 a circuit for operating switch-through relay 640.

Referring again to the reverting call circuit, the operation of relay 310 restores ground on the sleeve lead S for making the reverting call switch busy at contacts 313 (the operating time of relay 310 being made long enough to assure the release of the finder and selector); removes resistance battery from the HS*a* lead at now open contacts 312 in order to release ring control relay 610; completes another source of master ground from normal contacts 321 through operated contacts 317 and M–2; and completes a locking circuit for itself through its upper winding 310A, operated contacts 314 and normal or back contacts 233 to sleeve S*a*. In the connector, the release of relay 610 effects the de-energization of relay 550 at now open contacts 615. When relay 550 releases after a time delay, a circuit is completed for operating switch-through relay 640 from ground by way of operated contacts 534, normal contacts 632, winding 640B, normal contacts 555, sleeve brush S″ and sleeve bank contact to cut off battery in the line circuit. The switch through relay 640 is preferably a two-step relay in which the contacts 646 engage on the first step thereby applying master ground through relay winding 640A in order to complete the operation of relay 640. Upon the full operation of switch-through relay 640, the connector is switched through and seizes the called line. At this point in the operation of the system the called subscriber cannot be rung because ring trip relay 620 remains operated from its previous energization so that the ringing circuit is open at normal contacts 623.

Referring back to the de-energization of relay 230, upon the release of that relay, relay 330 is de-energized by the opening of contacts 232. After a delay corresponding to the release time of slow-to-release relay 330, relay 340 is de-energized at contacts 331. After another time interval corresponding to the release time of slow-to-release relay 340, relay 350 is de-energized by the opening of contacts 341. During the interval between the release of relay 340 and the release of slow-to-release relay 350, resistance battery is again applied to the HS*a* lead through resistor R–22, operated contacts 352, normal contacts 341, operated contacts 315, lead HS*a*, selector 15, selector 7, lead HS′, normal contacts 513, normal contacts 554, operated contacts 649*a* and winding 610B to ground.

The reoperation of relay 610 effects the release of ring trip relay 620 at contacts 613. The release of relay 620 prepares a circuit for reoperating busy test relay 630 from ground on the appropriate make contact of relays 710–750, brush HS″ and contacts 622 and 641*a* to the winding of relay 630. The closure of contacts 633 completes the ringing circuit so that the selected ringing generator is applied to the line circuit by way of common generator lead GEN, operated contacts 633, winding 620B, normal contacts 611 and 623, operated contacts 647, ring brush R″ and ring bank contact, line circuit, tip bank contact and tip wiper T″, operated contacts 648 and normal contacts 624 to ground.

Referring back to the reverting call circuit, upon the release of relay 350, resistance battery is removed from the HS*a* lead at contacts 352.

Upon the answering of the call by the called subscriber, the ring trip relay 620 is reoperated by the closure of the loop across tip and ring leads T″ and R″, respectively, thereby closing contacts 623*a* and 624*a* respectively to effect the operation of answering bridge relay 510 as described in connection with an ordinary non-reverting call. Upon the operation of relay 510 the connector returns resistance battery to the reverting call circuit through resistor R61 which in the illustrated embodiment of this invention takes the form of one winding of relay 610, operated contacts 514, lead HS′, selector 7, selector 15, lead HS*a* operated contacts 315 and normal contacts 341 and 351 to ground through relay winding 250B. Upon operation, relay 250 locks to master ground through its winding 250A and operated contacts 252.

In response to the operation of relay 250, relay 240 is released by the opening of contacts 251. Responsive to the release of relay 240, the circuit for relay winding 310B is opened at contacts 245, relay 310 holding through winding 310A. The release of relay 240 also opens the shunt across leads T′ and R′ at contacts 242, thereby causing the connector to remove ground momentarily from lead S*a* which releases the reverting call selector 15.

The removal of ground from lead S*a*, also effects the de-energization of relay winding 310A so that relay 310 releases and removes the master ground connection at normal contacts 321 because of the opening of contacts 317. Inasmuch as relays 220 and 230 were previously released, master ground disappears and relay 250 is released. The release of relay 310 also completes the circuit for energizing release magnet MZ over an obvious circuit through normal contacts 316 and the minor switch SW restores to its normal or home position at which time the release circuit is opened at contacts M–1. Winding 250B is de-energized upon the release of relay 310 by the opening of contacts 315. At this stage the switch train except for connector 8 is released, and connector 8 being held operated by the last party release feature.

Means is provided for releasing the reverting call circuit if the calling subscriber fails to dial all the required digits of the directory number. In such a case, the minor switch SW stands at one of the first three positions and there will be no connection through the wiper of the minor switch to operate relay 240. Hence, when the calling subscriber hangs up, relay 210 releases and relay 220 releases thereafter to complete, at contacts 226, a circuit for energizing release magnet MZ.

Means is also provided for releasing the reverting call circuit if either calling or called party fails to answer the call within a predetermined time after ringing commences.

There is provided, as indicated in Fig. 3, conventional timing pulse lead TP1 and holding ground lead H2. The appearance of a pulse on conductor TP1 at the beginning of the time-out period is extended through operated contacts 318 of relay 310 to energize permanent timing relay 320. Relay 320 locks up through winding 320B, operated contacts 322 and 319 to ground. The operation of relay 320 also switches holding or master ground through normal contacts 321 and operated contacts 317 to holding ground on hold conductor H2 through operated contacts 323, conductor H2 being connected to ground for a comparatively long interval after the appearance of the pulse on conductor TP1, as two minutes for example. If the circuits are not released within this time interval, ground is removed from conductor H2, as for example by the breaking of the circuit when insulating segment 30 engages brush 31, thereby removing holding ground from the master ground conductor which in turn effects the release of relay 310 for releasing the connection as previously described. Since the permanent timing feature is not part of the present invention but is only incident thereto, the common apparatus for controlling the energization of conductors TP1 and H2 is not illustrated in detail.

What we claim is:

1. In an automatic telephone system, a plurality of lines including a party line having a plurality of stations associated therewith; a connector; said connector including a switch controlled from any one of said lines to extend a call from said party line to the same or another line; a ring trip relay; a ring control relay; means responsive to the seizure of said connector on reverting calls for operating said relays; means responsive thereafter to replacement of the receiver for releasing said ring control relay; means for thereafter reoperating said ring control relay to extend a connection through said connector to said party line; means responsive to the reoperation of said ring control relay for effecting the release of said ring trip relay; a source of ringing signal; and means responsive to the release of said ring trip relay for applying a ringing signal to said party line.

2. In an automatic telephone system, a plurality of lines including a party line having a plurality of stations associated therewith; a connector; said connector including a switch controlled from any one of said lines to extend a call from said party line to the same or another line, a ring trip relay, and a ring control relay; means responsive to the seizure of said connector on reverting calls for operating both of said relays; directively controlled means for causing said switch to move to a position corresponding to said party line; means responsive thereafter to replacement of the receiver at the calling station for releasing said ring control relay; means responsive to the release of said ring control relay for seizing said party line; means thereafter effective to reoperate said ring control relay; means responsive to the reoperation of said ring control relay for effecting the release of said ring trip relay; a source of ringing signal; and means responsive to the release of said ring trip relay for applying said ringing signal to said party line.

3. In an automatic telephone system, a plurality of lines including a party line having a plurality of stations associated therewith; a connector; said connector including a switch controlled from any one of said lines to extend a call from said party line to the same or another line, a ring trip relay, and a ring control relay; means responsive to the seizure of said connector on reverting calls for operating said relays; a reverting call circuit included in the extended connection when the call is between stations on the same line, said reverting call circuit including a slow-to-release relay; means effective at a predetermined time after the replacement of the receiver at the calling station on a reverting call for operating said slow-to-release relay; means responsive to said replacement of the receiver for releasing said ring control relay; means responsive to the release of said ring control relay for extending a call through said connector to said party line; means for thereafter de-energizing said slow-to-release relay and reoperating said ring control relay; means responsive to the reoperation of said ring control relay for effecting the release of said ring trip relay; a source of ringing signal; means responsive to the release of said ring trip relay for applying a ringing signal to said party line; means responsive to the release of said slow-to-release relay after a predetermined time interval for again releasing said ring control relay.

4. In an automatic telephone system, a plurality of lines including a party line having a plurality of stations associated therewith; a connector; said connector including a switch controlled from any of said lines to extend a call from said party line to the same or another line, a ring trip relay, a busy test relay, and a ring control relay; means responsive to the seizure of said connector on a reverting call between stations on said party line for operating said ring control and ring trip relays; directively-controlled means for causing said switch to move to a position corresponding to the party line on said reverting call; means responsive to said positioning of said switch for operating said busy test relay; a source of busy signal; means responsive to the operation of said busy test relay for transmitting said busy signal to the calling station; means effective upon the replacing of the receiver at said calling station thereafter for releasing said busy test relay and said ring control relay; means responsive to the release of said ring control relay for causing the seizing of the called line by said switch; means for thereafter reoperating said ring control relay; means responsive to the reoperation of said ring control relay for releasing said ring trip relay; a source of ringing signal; and means responsive to the release of said ring trip relay for applying a ringing signal to said party line.

5. In an automatic telephone system, a plurality of lines including a party line having a plurality of stations connected thereto; a connector; said connector including a switch controlled from any of said lines to extend a call from said party line to the same or another line, a ring trip relay, a slow-to-release relay, a busy test relay, a ring control relay, and a switching relay; means responsive to the seizure of said connector on a reverting call between stations on said party line for operating said ring control, ring trip, and slow-to-release relays; means responsive to the operation of said ring control relay for holding operated said slow-to-release relay; directively controlled means for causing said switch to move to a position corresponding to said party line on said reverting call; means responsive to said positioning of said switch for operating said busy test relay; a source of busy tone, means responsive to the operation of said busy test relay for transmitting said busy tone to the calling station; means effective upon the replacing of the receiver at said calling station thereafter for releasing said busy test relay and said ring control relay; means responsive to the release of said ring control relay for releasing said slow-to-release relay; means responsive to the release of said slow-to-release relay for causing the operation of said switching relay thereby to seize the called line; means for thereafter reoperating said ring control relay; means responsive to the reoperation of said ring control relay for releasing said ring trip relay; a source of ringing signal; and means responsive to the release of said ring trip relay for applying said ringing signal to said party line.

6. In an automatic telephone system, a plurality of local lines including a party line having a plurality of stations associated therewith; a toll line; a connector; a reverting call circuit; said connector having a ring trip relay and a ring control relay; means for extending a connection from any of said lines to said connector; means for operating said ring control relay from said toll line following the extension of a connection from said toll line to said connector; means responsive to a call between different stations on said party line for causing the extension of a connection from said party line to said connector through said reverting call circuit; means for operating said ring control relay from said reverting call circuit following the extension of a call from said party line to said connector on a call between said different stations; means responsive to the operation of said ring control relay for operating said ring cut-off relay; means for thereafter re-operating said ring control relay; and means responsive to the re-operation of said ring control relay for releasing said ring trip relay.

7. In an automatic telephone system, a plurality of local lines including a party line having a plurality of stations associated therewith; a toll line; a connector; a reverting call circuit; said connector having a ring trip relay and a ring control relay; means for extending a connection from any of said lines to said connector; means for operating said ring control relay from said toll line following the extension of a connection from said toll line to said connector; means responsive to a call between different stations on said party line for causing the extension of a connection from said party line to said connector through said reverting call circuit; means for operating said ring control relay from said reverting call circuit following the extension of a call from said party line to said connector on a call between said different stations; means responsive to the operation of said ring control relay for operating said ring cut-off relay; means for thereafter releasing said ring control relay while maintaining the operation of said ring trip relay; means for thereafter re-operating said ring control relay; and means responsive to the re-operation of said ring control relay for releasing said ring trip relay.

8. In an automatic telephone system, a plurality of local lines including a party line having a plurality of stations associated therewith; a toll line; a connector; a reverting call circuit; said connector having a ring trip relay and a ring control relay; means for extending a connection from any of said lines to said connector; means for operating said ring control relay from said toll line following the extension of a connection from said toll line to said connector; means responsive to a call between different stations on said party line for causing the extension of a connection from said party line to said connector through said reverting call circuit; means for operating said ring control relay from said reverting call circuit following the extension of a call from said party line to said connector on a call between said different stations; means responsive to the operation of said ring control relay for operating said ring cut-off relay; means for thereafter releasing said ring control relay from said toll line on toll calls and responsive to hang up at the calling station on calls between said different stations while maintaining the operation of said ring trip relay; means for thereafter re-operating said ring control relay; and means responsive to the re-operation of said ring control relay for releasing said ring trip relay.

9. In an automatic telephone system, a plurality of local lines including a party line having a plurality of stations associated therewith; a toll line; a connector; a reverting call circuit; said connector having a ring trip relay and a ring control relay; means for extending a connection from any of said lines to said connector; means for operating said ring control relay from said toll line following the extension of a connection from said toll line to said connector; means responsive to a call between different stations on said party line for causing the extension of a connection from said party line to said connector through said reverting call circuit; means for operating said ring control relay from said reverting call circuit following the extension of a call from said party line to said connector on a call between said different stations; means responsive to the operation of said ring control relay for operating said ring cut-off relay; means for thereafter re-operating said ring control relay; means responsive to the re-operation of said ring control relay for effecting the release of said ring trip relay; a source of ringing signal; and means responsive to the release of said ring trip relay for applying said ringing signal to the called line.

References Cited in the file of this patent

UNITED STATES PATENTS

| | | |
|---|---|---|
| 2,571,250 | Jones | Oct. 16, 1951 |
| 2,602,120 | Bakker | July 1, 1952 |